J. C. QUINTIN.
WIND DEFLECTOR.
APPLICATION FILED MAY 20, 1919.
1,364,053.
Patented Dec. 28, 1920.
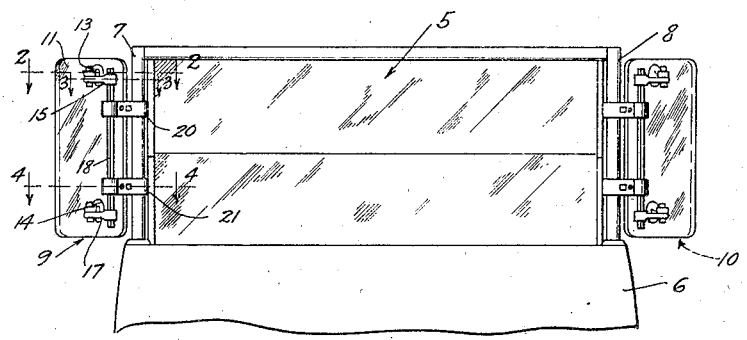
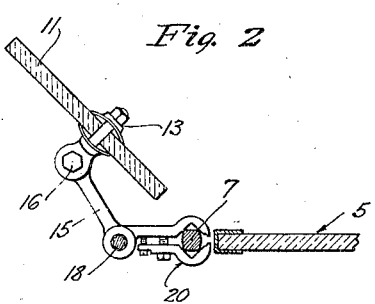
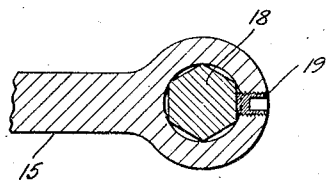
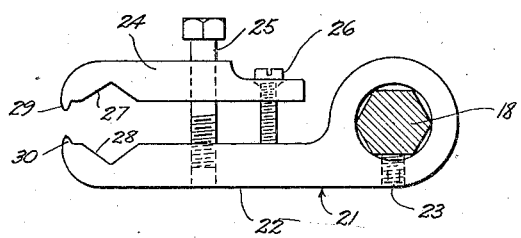
Inventor
John C. Quintin
by Westall and Wallace
his Attorneys

UNITED STATES PATENT OFFICE.

JOHN C. QUINTIN, OF SOUTH PASADENA, CALIFORNIA, ASSIGNOR, BY MESNE ASSIGNMENTS, TO DUSTIN-ROMAN AUTO TOP COMPANY, OF LOS ANGELES, CALIFORNIA, A CORPORATION.

WIND-DEFLECTOR.

1,364,053.      Specification of Letters Patent.      Patented Dec. 28, 1920.

Application filed May 20, 1919. Serial No. 298,431.

*To all whom it may concern:*

Be it known that I, JOHN C. QUINTIN, citizen of the United States, residing at South Pasadena, in the county of Los Angeles and State of California, have invented new and useful Improvements in Wind-Deflectors, of which the following is a specification.

This invention relates to the type of transparent wind deflector for motor cars and the like, in which the deflector consists of a wing extending laterally from the wind shield, on which it is supported and adapted to be set at an angle so as to deflect the air laterally and thus shield the occupants of the car from the currents of air which would otherwise flow around the edges of the wind shield.

It is the principal object of this invention to provide wind deflectors which may be secured in an adjustable manner at the opposite sides of the wind shield without alteration or mutilation of the latter. Another object of this invention is to provide a mounting for the deflectors which will allow adjustment with respect to the lateral edges of the wind shield and will not place undue strain upon the glass of the deflector. A further object of this invention is to provide a wind shield, which is simple and durable in its construction, rigid when set in adjusted position and neat in appearance.

These objects will be more fully understood, as will also other objects and corresponding accomplishments of my invention from the following detailed description of a preferred embodiment thereof. For the purpose of this description reference is had to the accompanying drawing, in which:

Figure 1 is a fragmentary front elevation of an automobile having wind deflectors mounted at opposite sides of the wind shield; Fig. 2 is an enlarged section taken on the line 2—2 of Fig. 1; Fig. 3 is an enlarged fragmentary section taken on the line 3—3; and Fig. 4 is an enlarged plan view of a clamp.

Referring more particularly to the drawing and especially Fig. 1, a wind shield is indicated by 5, being mounted transversely on an automobile body 6. The wind shield is supported by standards 7 and 8. Detachably mounted upon the standards are the deflectors indicated generally by 9 and 10.

The deflectors are duplicates of each other and only one will be described. It consists of a glass plate 11 having holes bored therein adjacent each end for attachment to brackets. Extending through the holes in the glass plate are bolts 13 and 14 of like construction. The bolts are suitably secured to the glass by resilient washers or the like, and the heads of the bolts have eyes. The bolt 13 is secured to an arm 15 by means of a clamping bolt 16 passing through the eye in bolt 13 and a registering eye in arm 15 so as to make a friction joint. The corresponding arm for bolt 14 is indicated by 17. The other end of arm 15 has an eye with a circular bore therein, in which is disposed a rod 18 having flattened sides. The rod 18 is preferably made hexagonal in form. Threaded into the eye for engaging the rod 18 is a safety set-screw 19. Clamps 20 and 21 are mounted on the rod 18 and detachably supported upon the standard 7.

Each clamp comprises a jaw member 22 having an eye at one end thereof adapted to slip over the rod 18 and a jaw at the other end adapted to grip the standard 7. A safety set-screw 23 extends into the eye opening for the purpose of engaging the rod 18. A second jaw member coöperating with jaw member 22 is secured thereto by means of a bolt 25, and spaced therefrom by means of an abutment screw 26. It will be noted that the jaws have opposing angular recesses 27 and 28 adapted to firmly grip a hexagonal standard or a round standard. There are also lips 29 and 30, making a jaw construction which is adapted to engage any of the types of standards in common use.

One of the difficulties experienced with wind deflectors which are supported by an element passing through two holes in the glass plate and clamped thereto is that due to inaccuracies in the boring of the holes or of the ends of the supporting member clamped thereto an initial strain is placed upon the glass. With vibration of the vehicle and expansion and contraction of the plates and supports, this strain becomes sufficient to fracture or break the glass. With my construction no such initial strain is placed upon the glass. The bolts 13 and 14 are placed in position, the rod 18 rove through the eyes in the arms, and when the set-screws therein are tightened no initial strain has been placed upon the glass.

The deflector being assembled as shown in Fig. 1, the jaws of the clamps 20 and 21 are opened so as to embrace the standard 7, and then firmly clamped thereto by means of the clamping screws. The set-screws 23 are tightened so that rod 18 is firmly secured in position. The set-screws engaging the flat side of the rod 18 make a rigid connection between the clamp and the rod. The rod cannot slip or become loose from vibration. The arms 15 and 17 are adjusted to the desired angle and the set-screws 19 tightened making a rigid and non-slip connection. The glass plates may then be adjusted to their desired angular relation with the arms 15 and 17 and the bolts 16 tightened to hold the glass plate in position.

It is obvious that the weight of the wind deflector is distributed over two points of the wind shield standard, thereby decreasing the strain thereon and rigidly holding the deflector against vibration. After adjustment and tightening of the set-screws, all parts are rigidly and firmly held together. The only strain upon the glass plate is that due to the weight of the plate itself.

What I claim is:

1. In a wind deflector, the combination of a glass plate having holes therein, independent articulated supporting members passed through said holes and fastened to said glass, said supporting members having openings at their free ends, a rod passed through said openings and adjustably secured to said members, and a clamp for engaging a standard, said clamp being adjustably secured to said rod.

2. In a wind deflector, the combination of a glass plate having holes therein, independent articulated supporting members passed through said holes and clamped to said glass, said supporting members having eyes at their free ends, a polyhedral rod passed through said eyes, means to adjustably clamp said members to said rod, and a clamp for engaging a standard, said clamp being adjustably secured to said rod.

3. In a wind deflector, the combination of a glass plate having holes therein, independent articulated supporting members passed through said holes and clamped to said glass, said supporting members having adjustable hinged joints therein and eyes at their free ends, a polyhedral rod passed through said eyes, means to clamp said members to said rod, two clamps having eyes through which said rod passes, and means to adjustably secure said clamps to said rod.

In witness that I claim the foregoing I have hereunto subscribed my name this 13th day of May, 1919.

JOHN C. QUINTIN.